Dec. 13, 1927.

H. N. ATWOOD 1,652,511

VEHICLE WHEEL

Filed Aug. 23, 1923

Inventor

Harry N. Atwood.

By

Lacy & Lacey, Attorneys

Dec. 13, 1927.

H. N. ATWOOD 1,652,511

VEHICLE WHEEL

Filed Aug. 23, 1923

Inventor

Harry N. Atwood.

By Lacey & Lacey, Attorneys

Patented Dec. 13, 1927.

1,652,511

UNITED STATES PATENT OFFICE.

HARRY N. ATWOOD, OF MONSON, MASSACHUSETTS.

VEHICLE WHEEL.

Application filed August 23, 1923. Serial No. 658,941.

This invention relates to an improvement in composite vehicle wheels.

It is a recognized fact that the ordinary vehicle wheel presents disadvantages due to its rigidity, weight, and cumbersome construction. Because of the rigidity of such a wheel and notwithstanding the use of a pneumatic tire, the parts of the automobile of which it constitutes an element, are subjected to severe vibrations and shocks, the force of which is, if anything, increased because of the heavy and cumbersome nature of the structure. Therefore, it is the primary object of the present invention to provide a vehicle wheel which will be relatively light in weight, will possess a maximum degree of strength and durability, and yet be yieldable or resilient to a desirable degree so as to provide for the absorption of shocks and vibrations and prevent their transmission to the bearings or other parts of the automobile.

Another object of the invention is to provide a vehicle wheel of composite structure possessing properties rendering it exceptionally durable, shock absorbing, proof against warping or other distortion through impacts or the absorption of moisture, and yieldable or resilient to a degree to supplement the cushioning qualities of the tire employed thereon.

Another object of the invention is to provide a composite wheel comprising a body and a rim, and to so construct the parts that the rim may be completely bodily separated from the body and reapplied thereto in a convenient manner, and after removal from the body may have its component parts separated so as to provide for the more convenient removal and remounting of the pneumatic tire casing which is fitted thereto.

Figure 1:
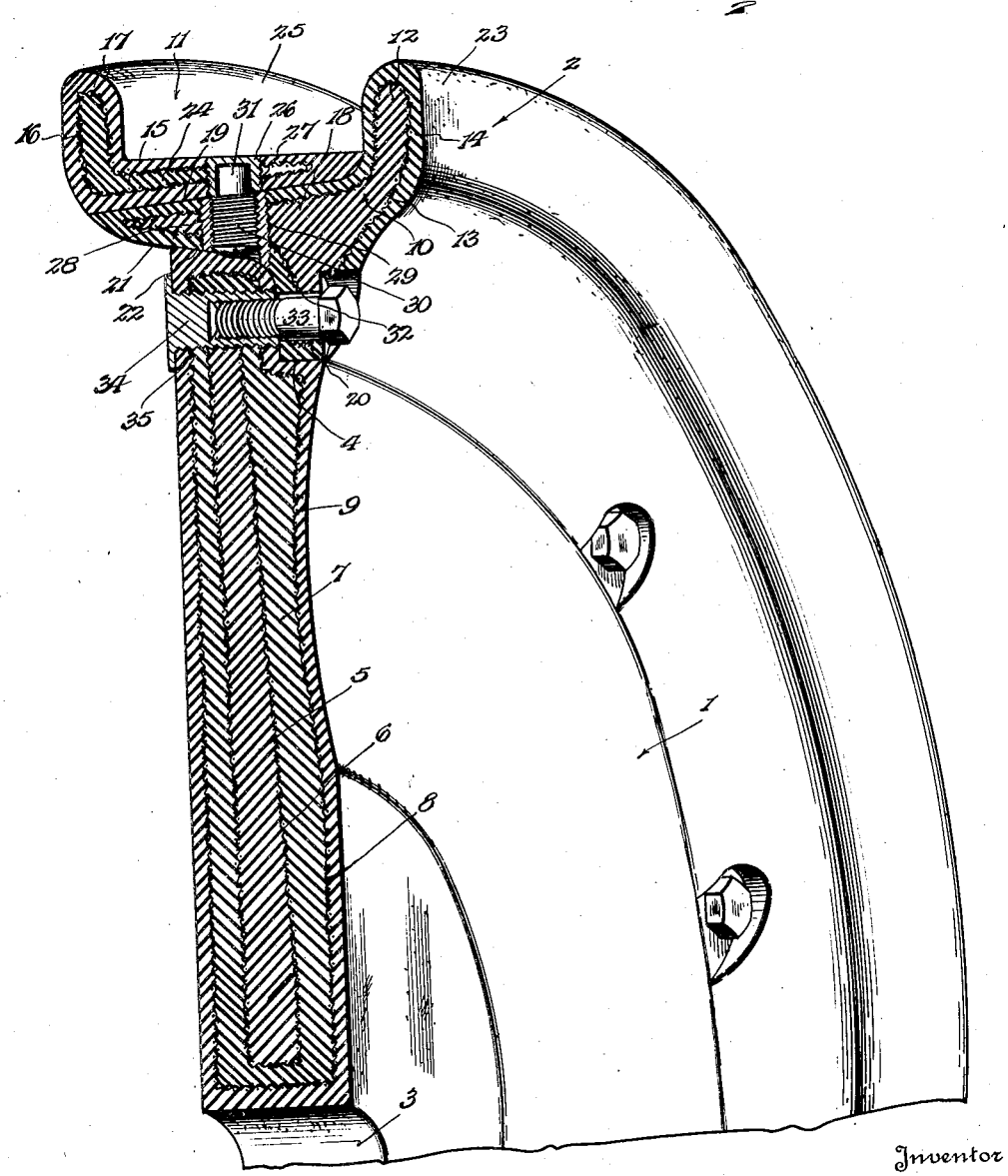
Figure 1 is a sectional perspective view illustrating a wheel constructed in accordance with the present invention.

The wheel illustrated in the drawings is designed primarily for employment upon passenger and other light types of automobiles, and is therefore constructed to be equipped with a pneumatic tire and casing.

The wheel comprises a body which is indicated in general by the numeral 1, and a rim or felly which is indicated in general by the numeral 2.

The wheel body 1 is of circular form and may have its faces of any desired contour, and the body is preferably provided centrally with an opening 3 to accommodate a spindle bearing (not shown) which may be fitted to the wheel and may be of any approved type. The body 1 is provided at its peripheral portion with a circumscribing rabbet 4 to accommodate the rim or felly 2 as will presently be explained, and the body is made up preferably in the following manner. An annular substantially flat sided core 5 of soft rubber is first prepared, and after it is formed it is enveloped in a covering 6 of woven wire mesh material, this covering extending entirely about and completely enclosing the core and being preferably formed by weaving the wire, in a machine provided for that purpose, directly about the core. A layer 7 of soft rubber is then built up about the enclosed core, and the assemblage thus obtained is enveloped in a woven wire mesh covering 8 which is formed and applied in the wire weaving machine referred to above and in substantially the same manner as in the formation of the covering 6. The assemblage is then provided with a covering layer 9 of soft rubber, and the whole is then placed in a suitable mold and subjected to vulcanization. The vulcanization treatment may be carried on for a shorter or longer period of time as may be found expedient and depending upon the hardness or toughness which it is desired the rubber content of the body shall possess. At this point it will be evident that in the step of vulcanization the rubber will become intimately incorporated with the woven wire mesh members 6 and 8, these members serving to reinforce the wheel body and impart the desired degree of stiffness thereto without, however, in any way impairing the elasticity of the rubber of the body or its shock absorbing and cushioning qualities. Furthermore, while the reinforcing members 6 and 8 are intimately incorporated in the rubber body of the wheel and cannot become stretched or similarly distorted, nevertheless the meshes of these members may yield sufficiently to enable the rubber body of the wheel to efficiently perform its cushioning and shock absorbing functions. It will also be evident that the members 6 and 8 are completely embedded in the rubber of the wheel body so that while these members are of woven metallic mesh material, nevertheless they will be protected from moisture and cannot become rusted or corroded.

The rim or felly 2 comprises two sections, one indicated in general by the numeral 10, and the other in general by the numeral 11. The section 10 is first formed by molding to the required shape, a core 12 of soft rubber, weaving thereover, as in the manner previously explained, an enveloping reinforcing member 13, and applying a covering layer 14 of rubber over the assemblage thus produced. The member 11 is similarly formed and comprises a core 15, a woven wire reinforcing member 16, and a cover layer 17 of rubber.

The section 10 of the rim comprises a body portion 18 having its outwardly presented circumferential face 19 substantially conical, and the said body 18 is formed at its inner side with an inwardly projecting circumferential flange 20 which seats within the rabbet 4 in the manner clearly shown in the drawings, the said flange being offset at one side of the rim section, and the said inner side of the rim section being preferably of conical form as indicated by the numeral 21 and tapered in a direction the reverse of that of the outer face 19. The periphery of the wheel body 1 is beveled as indicated by the numeral 22 and by reference to Figure 1 it will be observed that the rim section 10 is to fit snugly over the periphery of the wheel body, the flange 20 being, as stated, received within the rabbet 4. At the same side at which the flange 20 is located, the rim section 10 is formed with a tire casing flange indicated by the numeral 23 and this flange may take any form required to adapt it to fit the beads of a selected type of pneumatic tire casing.

The rim section 11 comprises an annular body portion 24, the inner side of which is of conical form to adapt the body to be snugly and frictionally fitted onto and held upon the outer side of the body 18 of the rim section 10, and the said rim section 11 is provided with a tire casing flange 25 which is located opposite and coacts with the flange 23 of the section 10 in holding the tire casing upon the rim. At this point it will be observed that the reinforcing members 13 and 16 of the sections 10 and 11 possess substantially the same general contour as the sections as a whole but are of course of smaller dimensions. The said members 13 and 16 of course serve to reinforce and suitably stiffen the rubber of the two rim sections but at the same time do not impair the resiliency and cushioning qualities of the rim as a whole. In order that the sections may be held assembled, thimbles 26 are fitted into openings 27 formed at suitable intervals in the circumference of the body 24 of the section 11, and bushings 28 are threaded or otherwise fitted into openings 29 formed in the body 18 of the rim section 10, and when the sections are assembled, the bushings 28 will register or substantially register with the thimbles 26. Stud bolts 30 are threaded into the bushings 28 and have smooth cylindrical stud portions 31 adapted to engage in the respective thimbles 26, it being observed by reference to Figure 1 that the heads of the stud bolts 30 are received completely within the bushings 28 and that the bushings are closed at their inner ends by the beveled peripheral surface 22 of the wheel body. Therefore, there can be no loss of the stud bolts 30 nor can they become loosened to such an extent as to permit of any separation of the members 10 and 11. However, after the rim as a whole has been removed from the wheel body, the stud bolts 30 may be removed and thus permit of separation of the said sections 10 and 11.

In order to secure the rim in place upon the wheel body, the flange 20 is formed at suitable intervals with openings 32 and bolts 33 are fitted through the openings 32 and are threaded into thimbles 34 which are threaded or otherwise held in openings 35 formed at intervals in the peripheral portion of the body of the wheel. Of course, by removing the bolts 33, the rim and the tire mounted thereon may be bodily removed from the wheel body and another rim and tire substituted therefor, and when it is desired to remove the tire casing for the purpose of repairing the punctured tube, the stud bolts 30 may be removed and the sections 10 and 11 may be separated to provide for ready dismounting of the tire casing.

Figure 2:
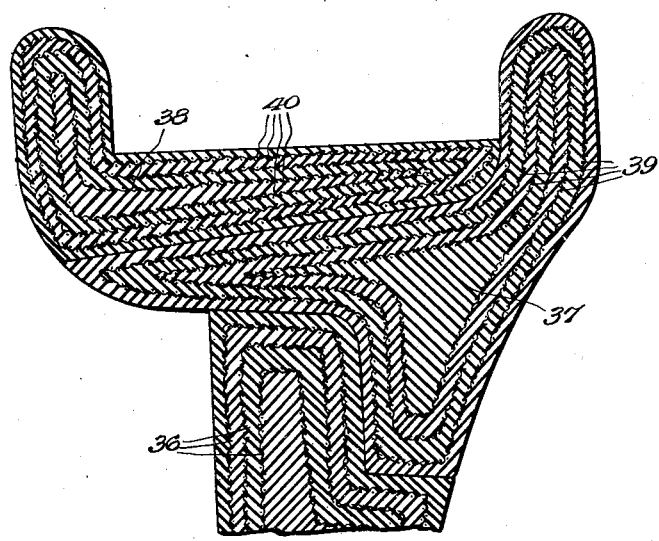
Figure 2 is a detail transverse sectional view illustrating a modification of the invention.
Figure 3:
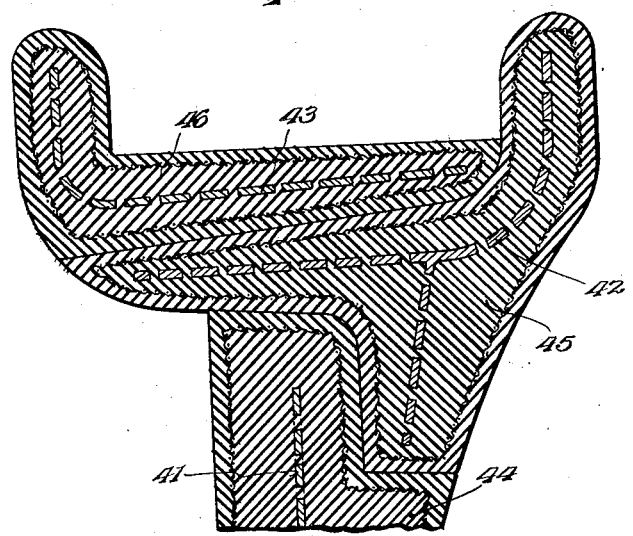
Figure 3 is a view similar to Figure 2 illustrating a further modification of the invention.

In the form of the invention above described and illustrated more particularly in Figure 1 of the drawings, the body of the wheel is reinforced by two woven wire reinforcing members 6 and 8, and each rim section is reinforced by a single woven wire reinforcing member. In the embodiment illustrated in Figure 2, however, the numeral 36 indicates more than two woven wire reinforcing members which are embedded in the rubber of the wheel body, and in this embodiment the rim sections which are indicated by the numerals 37 and 38, are likewise reinforced by more than two woven wire reinforcing members which are indicated by the numerals 39 and 40, respectively. In this modified structure the wheel parts are, of course, built up in precisely the same way as described in connection with the form shown in Figure 1, the only difference being that a relatively large number of reinforcing members is woven into the respective wheel parts.

Under some conditions it may be desirable to more solidly reinforce the wheel body or the members of the rim to stiffen these parts and render them less yieldable, and where this is desired, reinforcing members 41, 42 and 43 will be embedded respectively in the wheel body which is indicated by the numeral 44, and the rim sections which are indicated by the numerals 45 and 46. The reinforcing members 41, 42 and 43 may be formed in any desired manner as, for example, from expanded sheet metal or from perforated sheet metal, and they will conform generally to the contour of the wheel body or rim sections of which they constitute a part, the said reinforcing members being embedded centrally in the parts. The reinforcing members may, of course, be stamped, pressed or formed in any other manner to reduce them to the proper form, and when embedded centrally in the wheel parts which they are to respectively reinforce, they will be enclosed or enveloped by a woven wire reinforcing member corresponding to the members previously described.

While the wheel body and rim sections are built up by incorporating successive masses of rubber in the structure and weaving the reinforcements, it will be understood that after the body or rim part has been cured in the mold, it will possess a substantially uniform consistency throughout; that is to say, the rubber of the part will be cured through and through so that there will be no line of division between the successively added masses but all will be united to form an integral and substantially homogeneous body, during the curing operation, in which the reinforcements are embedded.

Having thus described the invention, what is claimed as new is:

1. A vehicle wheel rim comprising sections separably fitted together, each of said sections comprising a body of rubber, and a woven mesh reinforcement embedded therein.

2. A vehicle wheel part including a body of rubber integral throughout and comprising a core portion and a portion enclosing the core portion, a woven mesh reinforcement completely enveloping the core portion and embedded in the two said portions, and a reinforcement of more rigid material embedded in the said core portion.

3. A vehicle wheel part including a body of rubber integral throughout and comprising a core portion and a portion enclosing the core portion, a woven mesh reinforcement completely enveloping the core portion and embedded in the two said portions, and a reinforcement of foraminous sheet metal embedded in the said core portion.

4. A composite vehicle wheel part comprising a rubber core having the general contour of said part, a woven mesh reenforcement completely enveloping the core, and a covering layer of rubber completely enveloping the core and reenforcement, all bonded together by vulcanization.

5. A vehicle wheel rim comprising a section consisting of an annular body exteriorly of conical form and provided at its side which is of greater diameter with a continuous tire retaining flange, a section consisting of an annular body exteriorly cylindrical and interiorly of conical form and provided with a continuous tire retaining flange opposing the flange of the first mentioned section, when the second mentioned section is fitted onto the first mentioned section, and coacting means upon the bodies of the sections connecting the sections in their assembled relation, the said means comprising a socket member embedded in the body of the last mentioned section and having its open side presented at the inner side of said body, a threaded tubular bushing embedded in the body of the first mentioned section, and a stud threaded into the said bushing and having a reduced end engaging in the said socket member.

6. A vehicle wheel rim comprising a section consisting of an annular body exteriorly of conical form and provided at its side which is of greater diameter with a continuous tire retaining flange, the said body including a core portion of substantially the cross sectional contour of the section as a whole, a woven mesh reenforcement completely enveloping the core portion, and a covering layer of rubber completely enveloping the core and reenforcement, the said reenforcement and a portion of the core extending into and constituting a part of the said flange, a section consisting of an annular body of the same construction as the body of the first mentioned section and interiorly of conical form and provided with a continuous tire retaining flange opposing the flange of the first mentioned section, when the second mentioned section is fitted onto the first mentioned section, and coacting means upon the bodies of the sections connecting the sections in their assembled relation.

7. A vehicle wheel rim comprising a section consisting of an annular body exteriorly of conical form and provided at its side which is of greater diameter with a continuous tire retaining flange, the said body including a core portion of substantially the cross sectional contour of the section as a whole, a woven mesh reenforcement completely enveloping the core portion, and a covering layer of rubber completely enveloping the core and reenforcement, the said reenforcement and a portion of the core extending into and constituting a part of the said flange, a section consisting of an annular body of the same construction as the body of the first mentioned section and interiorly of conical form and provided with a continuous tire retaining flange opposing the flange of the first mentioned section, when the second mentioned section is fitted onto the first mentioned section, and coacting means upon the bodies of the sections connecting the sections in their assembled relation, the said means comprising a socket member embedded in the body of the second mentioned section and extending through the core and reenforcement and opening at its open side at the inner side of the said body, an interiorly threaded bushing embedded in the body of the first mentioned section and extending through the reenforcement and core thereof and opening through both the inner and outer sides of the body, and a threaded stud fitted into the said bushing and having a reduced end engaging in the said socket.

In testimony whereof I affix my signature.

HARRY N. ATWOOD. [L. S.]